United States Patent [19]
Habermeier et al.

[11] 3,875,190
[45] Apr. 1, 1975

[54] GLYCIDYLURETHANE COMPOUNDS, PROCESSES FOR THEIR MANUFACTURE AND THEIR USE

[75] Inventors: Jürgen Habermeier, Pfeffingen; Daniel Porret, Binningen, both of Switzerland

[73] Assignee: Ciba-Geigy Corporation, Ardsley, N.Y.

[22] Filed: Nov. 21, 1972

[21] Appl. No.: 308,624

[30] Foreign Application Priority Data
Nov. 24, 1971 Switzerland.................... 17125/71

[52] U.S. Cl............. 260/348 A, 260/2 EP, 260/77.5
[51] Int. Cl........................... C07d 1/22, C07d 1/00
[58] Field of Search................................ 260/348 A

[56] References Cited
UNITED STATES PATENTS
3,440,230   4/1969   Doss ................................. 260/77.5

OTHER PUBLICATIONS
Chemical Abstracts, Vol. 68 (1968) 79757n.

*Primary Examiner*—Norma S. Milestone
*Attorney, Agent, or Firm*—Vincent J. Cavalieri

[57]        ABSTRACT
New glycidyl-urethane compounds are obtained by glycidylating certain N-phenylurethanes in a known manner.

The new glycidyl-urethane compounds can be cured with the customary curing agents for epoxide resins and thereby yield moulded materials with technically valuable properties.

2 Claims, No Drawings

GLYCIDYLURETHANE COMPOUNDS, PROCESSES FOR THEIR MANUFACTURE AND THEIR USE

The subject of the present invention are new glycidylurethane or β-methylglycidylurethane compounds which contain, at least once, the structural element of the formula

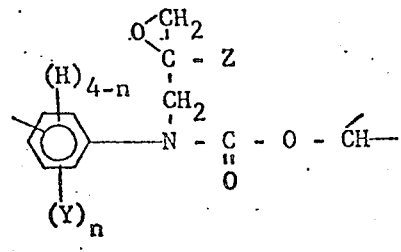

wherein Z denotes a hydrogen atom or the methyl group, Y denotes a halogen atom, an alkyl group or an alkoxy group and $n$ denotes a number from 0 to 4, preferably 0.

The new glycidylurethane compounds are manufactured in accordance with methods which are in themselves known. Preferably, the procedure followed is that in a urethane compound which contains, at least once, the structural element of the formula

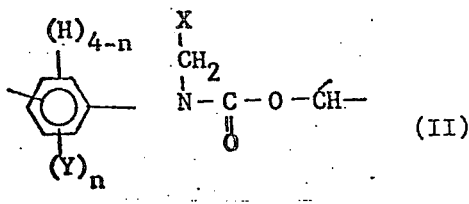

wherein Y and $n$ have the abovementioned meaning and the radical X is a radical which can be converted into the 1,2-epoxyethyl or 1-methyl-1,2-epoxyethyl radical, this radical X is converted into the epoxyethyl or 1-methyl-1,2-epoxyethyl radical.

A radical X which can be converted into the 1,2-epoxyethyl radical is above all a hydroxyhalogenoethyl radical which carries the functional groups on different carbon atoms, especially a 2-halogeno-1-hydroxyethyl radical or a 2-halogeno-1-hydroxy-1-methyl-ethyl radical. Halogen atoms are here especially chlorine or bromine atoms. The reaction is carried out in the usual manner, above all in the presence of agents which split off hydrogen halide, such as strong alkalis, for example anhydrous sodium hydroxide or aqueous sodium hydroxide solution. However, it is also possible to use other strongly alkaline reagents, such as potassium hydroxide, barium hydroxide, calcium hydroxide, sodium carbonate or potassium carbonate.

A further radical X which can be converted into the 1,2-epoxyethyl radical is, for example, the ethenyl radical, which can be converted into the 1,2-epoxyethyl radical in a known manner such as, above all, by reaction with hydrogen peroxide or per-acids, for example peracetic acid, perbenzoic acid or monoperphthalic acid.

The starting substances containing the structural element of the formula (II) are obtained in a manner which is in itself known. Thus it is possible, for example, to react a urethane compound which contains, at least once, the structural element of the formula

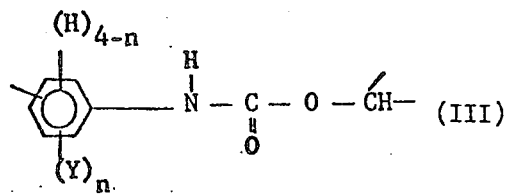

wherein Y and $n$ have the abovementioned meaning, with a compound of the formula X—CH₂—Hal, wherein Hal represents a halogen atom and X has the abovementioned meaning. Preferably, the urethane compound having the structural element of the formula (III) is reacted with an epihalogenohydrin or β-methylepihalogenohydrin, above all epichlorohydrin or β-methylepichlorohydrin, in the presence of a catalyst such as, in particular, a tertiary amine, a quaternary ammonium base or a quaternary ammonium salt. Suitable catalysts for the addition of epichlorohydrin or β-methylepichlorohydrin are above all tertiary amines, such as triethylamine, tri-n-propylamine, benzyldimethylamine, N,N'-dimethylaniline and triethanolamine; quaternary ammonium bases, such as benzyltrimethylammonium hydroxide; quaternary ammonium salts, such as tetramethylammonium chloride, tetraethylammonium chloride, benzyltrimethylammonium chloride, benzyltrimethylammonium acetate and methyltriethylammonium chloride; hydrazines with a tertiary nitrogen atom, such as 1,1-dimethylhydrazine, which can also be employed in the quaternised form; alkali halides, such as lithium chloride, potassium chloride and sodium chloride, bromide or fluoride; further, ion exchange resins with tertiary or quaternary amino groups, and also ion exchangers with acid amide groups. Basic impurities which can occur in technical commercially available forms of the starting compounds can also act as catalysts. In such cases it is not necessary to add a special catalyst.

The invention also relates to those embodiments of the process in which a compound obtainable as an intermediate product at any stage is used as the starting product and the missing steps are carried out, or a starting substance is formed under the reaction conditions and is further processed without isolating it.

A preferred embodiment of the process consists, for example, of reacting an epihalogenohydrin or β-methylepihalogenohydrin, preferably epichlorohydrin or β-methylepichlorohydrin, with a urethane compound containing the structural element of the formula (III), in the presence of a catalyst, such as, preferably, a tertiary amine, a quaternary ammonium base or a quaternary ammonium salt, and in a second stage treating the resulting product, containing halogenohydrin groups, with agents which split off hydrogen halide. In these reactions, the procedure described above is followed, and the compounds mentioned above can be used as catalysts for the addition of epihalogenohydrin or β-methylepihalogenohydrin or for the dehydrohalogenation. Particularly good yields are obtained if an excess of epichlorohydrin or β-methylepichlorohydrin is used. During the first reaction, before the addition of alkali, a partial epoxidation of the dichlorohydrin or of the dichloro-β-methylhydrin of the urethane compound already occurs. The epichlorohydrin or the β-methylepichlorohydrin which act as hydrogen chloride acceptors have then been partially converted into glycerine dichlorohydrin or into β-methylglycerine dichlorohydrin.

The addition of the epihalogenohydrin or of the β-methylepihalogenohydrin to the urethane compounds can be carried out in accordance with known processes, with or without solvents, with a small or major excess of epihalogenohydrin or β-methylepihalogenohydrin, at temperatures of up to 140°C, in 30 to 360 minutes under the catalytic action of tertiary amines, quaternary ammonium salts, alkali halides and other anionic catalysts. The subsequent dehydrohalogenation can be carried out at 40° to 70°C with solid or liquid alkalis, and if appropriate whilst azeotropically distilling off the water produced. The alkali halide is separated off in accordance with known processes. The resulting glycidylurethane or β-methylglycidylurethane compounds are isolated by distilling off the excess epihalogenohydrin or β-methylepihalogenohydrin and, if appropriate, the solvent. Colourless to pale yellow-coloured clear liquids of low viscosity, to highly viscous resins, are obtained in yields of up to 100% of theory.

Suitable urethane compounds for the manufacture of the new glycidylurethane or β-methylglycidylurethane compounds of the formula (I) are those which contain the structural element according to the formula (III) either once or several times.

Urethane compounds which contain the structural element according to the formula (III) once, correspond to the general formula

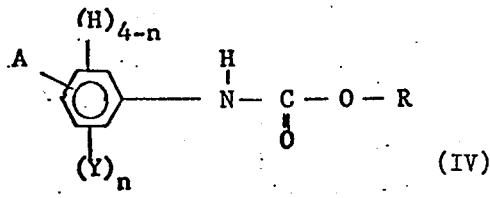

(IV)

wherein Y and n have the same meaning as in the formula (I), R denotes a radical of an aliphatic or cycloaliphatic monohydroxy compound obtained by removing the hydroxyl group, preferably an alkyl radical with 1–4 C atoms, and A denotes a hydrogen atom or a radical of the formula

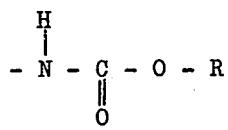

The compounds of the formula (IV) are obtained by reacting unsubstituted or substituted phenylisocyanate or unsubstituted or substituted phenylenediisocyanate, such as 3- or 4-methylphenylisocyanate, phenylene-1,4-diisocyanate, phenylene-1,3-diisocyanate, 2,3,5,6-tetramethyl-p-phenylenediisocyanate, toluylene-2,4-diisocyanate, toluylene-2,6-diisocyanate or their technical mixtures with equivalent amounts of an aliphatic or cycloaliphatic monohydroxy compound in accordance with known processes. As suitable aliphatic or cycloaliphatic monohydroxy compounds there may be mentioned: methanol, ethanol, propanol, isopropanol, butanol, isobutanol, tert.-butanol, pentanol, isoamyl alcohol, hexanol, cyclopentanol and cyclohexanol.

Urethane compounds which contain the structural element of the formula (I) twice or three times correspond to the general formula

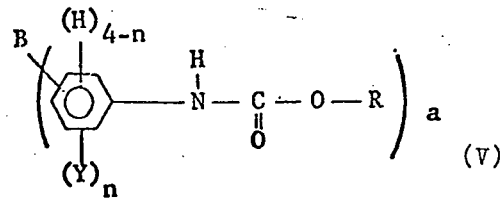

(V)

wherein Y and n have the same meaning as in the formula (I), R denotes a radical of an aliphatic or cycloaliphatic monohydroxy compound obtained by removing the hydroxyl group, preferably an alkyl radical with 1–4 C atoms, B denotes a divalent or trivalent organic radical, preferably an alkylene radical, an alkylene radical interrupted by ether oxygen atoms, an ether oxygen atom or the free valency and $a$ denotes the number 2 or 3, preferably 2.

The compounds of the formula (V) are obtained by reacting diisocyanates or triisocyanates of which the isocyanate groups are bonded to different benzene rings, with equivalent amounts of an aliphatic or cycloaliphatic monohydroxy compound, in a manner which is in itself known.

As suitable diisocyanates or triisocyanates of which the isocyanate groups are bonded to different benzene rings there may be mentioned: diphenylmethane-4,4'-diisocyanate, 3,3'-dimethyl-diphenyl-4,4'-diisocyanate, 3,3'-dimethoxy-4,4'-diphenyl-diisocyanate, 3,3'-dichloro-diphenyl-4,4'-diisocyanate, 4,4'-diphenyl-diisocyanate diphenyldimethyl-methane-4,4'-diisocyanate,p,p'-dibenzyl-diisocyanate, the uretdionediisocyanates obtainable by dimerisation of aromatic diisocyanates, such as, for example, 2,4-toluylenediisocyanate, for example 1,3-bis-(4'-methyl-3'-isocyanato-phenyl)-uretdione of the formula

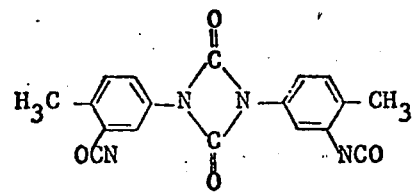

and N,N'-di-(4-methyl-3-isocyanato-phenyl)-urea.

Further, the following diisocyanates can be employed: the addition products of 2 mols of toluylene-2,4-diisocyanate to one mol of a glycol, such as are treated by E. Müller in Houben-Weyl, 4th edition, volume XIV/2, on pages 66 and 71–72. Further, the addition products of 3 mols of toluylene-2,4-diisocyanate to 1 mol of a triol, such as 1,1,1-trimethylolpropane, whereby an aromatic isocyanate containing urethane groups, which in the ideal case is trifunctional, is produced.

Suitable aliphatic or cycloaliphatic monohydroxy compounds are the same as those for the manufacture of urethane compounds of the formula (IV).

A further group of urethane compounds which contain the structural element of the formula (I) at least twice correspond to the general formula

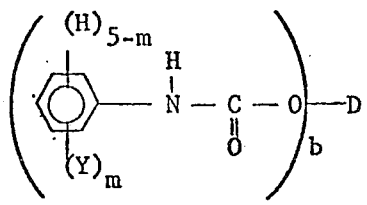

wherein Y denotes a halogen atom or an alkyl or alkoxy group, m denotes a number from 0 to 5, preferably 0 or 1, D denotes the radical, obtained by removal of the hydroxyl groups, of an aliphatic, cycloaliphatic, cycloaliphatic-aliphatic or heterocyclic-aliphatic diol or polyol and b denotes at least 2, preferably 2 or 3.

The compounds of the formula (VI) are obtained by reacting aliphatic, cycloaliphatic, cycyloaliphatic-aliphatic or heterocyclic-aliphatic diols or polyols with equivalent amounts of an unsubstituted or halogen-, alkyl- or alkoxy-substituted phenylisocyanate in a manner which is in itself known.

As suitable dialcohols of the aliphatic series there may be mentioned: ethylene glycol, 1,2-propanediol, 1,3-propanediol, 1,4-butanediol, 1,5-pentanediol, neopentyl glycol, 1,6-hexanediol, 1,7-heptanediol, 1,8-octanediol, 1,9-nonanediol, 1,10-decanediol, 1,11-undecanediol, 1,12-dodecanediol, 1,6-dihydroxy-2,2,4-trimethyl-hexane, 1,6-dihydroxy-2,4,4-trimethylhexane and 1,4-butenediol; polyether glycols, such as diethylene glycol, triethylene glycol, tetraethylene glycol, dipropylene glycol, polyethylene glycols and polypropylene glycols of average molecular weight 250 to 2,500, polybutylene glycols and polyhexanediols; hydroxy-polyesters, such as hydroxypivalic acid neopentyl-glycol diester.

As suitable dialcohols of the cycloaliphatic series there may be mentioned: 1,1-, 1,2-, 1,3- and 1,4-bis(hydroxymethyl)cyclohexane and the corresponding unsaturated cyclohexane derivatives, such as, for example, 1,1-bis-(hydroxymethyl)-cyclohexene-3 and 1,1-bis-(hydroxymethyl)2,5-methylenecyclohexane-3; hydrogenated diphenols, such as cis-quinitol, trans-quinitol, resorcitol, 1,2-dihydroxycyclohexane, bis-(4-hydroxy-cyclohexyl)-methane and 2,2-bis-(4'-hydroxycyclohexyl)-propane; tricyclo-(5,2,1,0$^{2,6}$)-decane-3,9-diol or -4,8-diol and adducts of glycols to diallylidene-pentaerythritol, for example 3,9-bis-(hydroxyethoxyethyl)spirobi-(metadioxane).

As dialcohols of the heterocyclic-aliphatic series it is in particular possible to use the addition products of at least 2 mols of an alkene oxide, such as ethylene oxide, propene oxide, 1,2-butene oxide or styrene oxide, to 1 mol of a mononuclear or polynuclear N-heterocyclic compound with two ring—NH— groups, such as, above all, hydantoin and its derivatives, dihydrouracil and its derivatives, barbituric acid and its derivatives, bishydantoins and bis-dihydrouracils. The following may be mentioned: 1,3-di-(β-hydroxyethyl)-5,5-dimethylhydantoin, 1,3-di-(β-hydroxyethyl)-5-phenyl-5-ethylbarbituric acid, 1,3-di-(β-hydroxy-n-propyl)-5,5-dimethylhydantoin, 1,3-di-(β-hydroxy-n-propyl)-5,5-diethylbarbituric acid, 1,3-di-(β-hydroxyethoxyethyl)-5,5-dimethylhydantoin, 1,3-di-(β-hydroxy-n-propyl)-5-isopropylhydantoin, 1,3-di-(β-hydroxy-n-propyl)-5,5-diethylhydantoin, 1,3-di-(β-hydroxy-n-propyl)-5-ethyl-5-methylhydantoin, 1,3-di-(β-hydroxyethyl)-5,5-dimethyl-6-isopropyl-5,6-dihydrouracil, 1,3-di-(β-hydroxy-n-propyl)5,5-dimethyl-6-isopropyl-5,6-dihydrouracil, 1,3-di-(2'-hydroxy-n-butyl)5,5-dimethylhydantoin, 1,3-di-(β-hydroxy-β-phenylethyl)5,5-dimethyl-hydantoin, 1,3-di-(β-hydroxy-β-phenylethyl)-6-methyluracil, 1,3-di-(β-hydroxy-β-phenylethyl)-5,5-dimethyl-6-isopropyl-5,6-dihydrouracil, 1,3-di-(β-hydroxy-β-phenylethoxy-β-phenylethoxy-β-phenyl-ethyl)-5,5 -dimethylhydantoin, 1,3-di-(β-hydroxy-β-phenylethyl)-5-isopropylhydantoin, 1,3-di-(β-hydroxy-β-phenylethyl)-5-ethyl-5-phenylbarbituric acid, 1,1'-methylene-bis-(3-β-hydroxyethyl-5,5-dimethylhydantoin), 1,1'-methylene-bis-(3-β-hydroxyethoxyethoxythyl-5,5-dimethylhydantoin), 1,1'-methylene-bis-(3-β-hydroxy-n-propyl-5,5-dimethyl-hydantoin), 1,1'-methylene-bis-(3-β-hydroxyethyl-5,5-dimethyl-5,6-dihydrouracil), 1,4-bis-(1'-β'-hydroxyethyl-5'35'-dimethylhydantoinyl-3')-butane, 1,6-bis-(1'-β'-hydroxyethyl-5',5'-dimethylhydantoinyl-3')-hexane, 1,6-bis-(1'-β'-hydroxy-n-propyl-5',5'-dimethylhydantoinyl-3')-hexane, 1,1'-methylene-bis-(3-β-hydroxypropyl-5-isopropylhydantoin), 1,1'-methylene-bis-(3-β-hydroxy-n-propyl-5,5-dimethyl-5,6-dihydrouracil), 1,1'-methylene-bis-(3-[2''-hydroxy-n-butyl]-5,5-dimethylhydantoin), 1,6-bis-(1'-[2''hydroxy-n-butyl]-5',5'-dimethylhydantoinyl-3')-hexane, β,β'-bis-(1-[2'-hydroxy-n-butyl]-5,5-dimethylhydantoinyl-3)-diethyl-ether and 1,1'-methylene-bis-(3-[β-hydroxy-β-phenylethyl]-5,5-dimethylhydantoin).

Possible triols or tetrols are, for example: glycerine, butane-1,2,4-triol, hexane-1,2,6-triol, 2,4-dihydroxy-3-hydroxymethylpentane, 1,1,1-trihydroxymethylethane, 1,1,1-trihydroxymethyl-propane, pentaerythritol, erythritol and the addition products of ethylene oxide or propylene oxide to one of the above polyols.

A further class of suitable urethane compounds which contain the structural element of the formula (I) more than once are linear polyurethanes of the formula

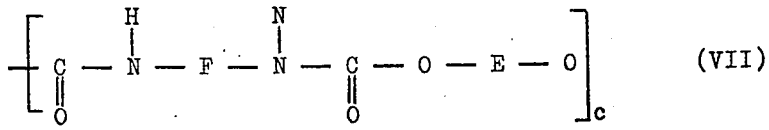

wherein c is a number greater than 1, E denotes the radical, obtained by removal of the hydroxyl groups, of an aliphatic, cycloaliphatic, cycloaliphatic-aliphatic or heterocyclicaliphatic diol and F denotes one of the two divalent radicals

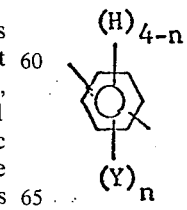 or 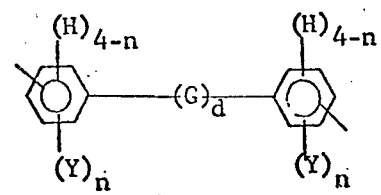

wherein Y and $n$ have the same meaning as in the formula (I), G denotes an alkylene radical, an alkylene radical interrupted by ether-oxygen atoms or an ether-oxygen atom and $d$ denotes the number 0 or 1.

The linear polyurethanes of the formula (VII) are obtained in accordance with methods which are in themselves known by reacting approximately equivalent amounts of the appropriate diisocyanate with the appropriate diol.

The glycidylurethanes and $\beta$-methylglycidylurethanes according to the invention, of the formula (I), react with the customary curing agents for epoxide resins. They can therefore be crosslinked or cured by addition of such curing agents, analogously to other polyfunctional epoxide compounds. The monofunctional glycidylurethanes and $\beta$-methylglycidylurethanes of the formula (I) are valuable active diluents and are therefore suitable for use as modifiers for epoxide resins, especially for improving the flow properties of curable epoxide resin mixtures.

Possible curing agents for the glycidylurethanes and $\beta$-methylglycidylurethanes according to the invention are both basic and acid compounds.

As examples of suitable curing agents there may be mentioned: amines or amides, such as aliphatic, cycloaliphatic or aromatic, primary, secondary and tertiary amines, for example monoethanolamine, ethylenediamine, hexamethylenediamine, trimethylhexamethylenediamine, diethylenetriamine, triethylenetetramine, tetraethylenepentamine, N,N-dimethyl-1,3-propylenediamine, N,N-diethyl-1,3-propylenediamine-2,2-bis-(4'-aminocyclohexyl)-propane, 3,5,5-trimethyl-3-(aminomethyl)-cyclohexylamine ("isophoronediamine"), Mannich bases, such as 2,4,6-tris-(dimethylaminomethyl)-phenol; m-phenylenediamine, p-phenylenediamine, bis-(4-aminophenyl)methane, bis-(4-aminophenyl)-sulphone and m-xylylenediamine; adducts of acrylonitrile or monoepoxides, such as ethylene oxide or propylene oxide, to polyalkylenepolyamines, such as diethylenetriamine or triethylenetetramine; adducts of polyamines, such as diethylenetriamine or triethylenetetramine in excess, and polyepoxides, such as diomethanepolyglycidyl-ethers; ketimines, for example from acetone or methyl ethyl ketone and bis(p-aminophenyl)-methane; adducts of monophenols or polyphenols and polyamines; polyamides, especially those from aliphatic polyamines, such as diethylenetriamine or triethylenetetramine, and dimerised or trimerised unsaturated fatty acids, such as dimerised linseed oil fatty acid ("VERSAMID"); polymeric polysulphides ("THIOKOL"); dicyandiamide, aniline-formaldehyde resins, polyhydric phenols, for example resorcinol, 2,2-bis-(4-hydroxyphenyl)-propane or phenol-formaldehyde resins; boron trifluoride and its complexes with organic compounds, such as $BF_3$-ether complexes and $BF_3$-amine complexes, for example $BF_3$-monoethylamine complex; acetoacetanilide-$BF_2$ complex; phosphoric acid; triphenylphosphite; polybasic carboxylic acids and their anhydrides, for example phthalic anhydride, $\Delta^4$-tetrahydrophthalic anhydride, hexahydrophthalic anhydride, 4-methylhexahydrophthalic anhydride, 3,6-endomethylene-$\Delta^4$-tetrahydrophthalic anhydride, methyl-3,6-endomethylene-$\Delta^4$-tetrahydrophthalic anhydride (=methylnadic anhydride), 3,4,5,6,7,7-hexachloro-3,6-endomethylene-$\Delta^4$-tetrahydrophthalic anhydride, succinic anhydride, adipic anhydride, azelaic anhydride, sebacic anhydride, maleic anhydride, dodecenyl-succinic anhydride; pyromellitic dianhydride, trimellitic anhydride or mixtures of such anhydrides.

Curing accelerators can furthermore be employed in the curing reaction, and in particular when using polyamides, dicyandiamide, polymeric polysulphides or poycarboxylic acid anhydrides as curing agents; such accelerators are, for example: tertiary amines, their salts or quaternary ammonium compounds, for example 2,4,6-tris-(dimethylaminomethyl)-phenol, benzyldimethylamine, 2-ethyl-4-methyl-imidazole, 4-aminopyridine and triamylammonium phenolate; $tin^{II}$-acylates, such as $tin^{II}$-octoate or alkali metal alcoholates, such as, for example, sodium hexanetriolate. In the amine curing reaction, monophenols or polyphenols, such as phenol or diomethane, salicylic acid or thiocyanates, can for example be employed as accelerators.

The term "curing" as used here denotes the conversion of the abovementioned glycidyl compounds into insoluble and infusible, crosslinked products, and in particular, as a rule, with simultaneous shaping to give mouldings, such as castings, pressings or laminates, or to give "sheet-like structures", such as coatings, coverings, lacquer films or adhesive bonds.

If desired, active diluents can be added to the polyglycidyl compounds according to the invention to lower the viscosity, such as, for example, styrene oxide, butyl glycidyl ether, isooctyl glycidyl ether, phenyl glycidyl ether, cresyl glycidyl ether, glycidyl ester of synthetic, highly branched, mainly tertiary aliphatic monocarboxylic acids ("CARDURA E"); or cycloaliphatic monoepoxides, such as 3-vinyl-2,4-dioxaspiro-(5.5)-9,10-epoxy-undecane. The glycidylurethanes according to the invention can furthermore be used as mixtures with other curable dipolyepoxide or polyepoxide compounds. As examples of such compounds there may be mentioned: polyglycidyl ethers of polyhydric alcohols, such as 1,4-butanediol, polyethylene glycols, polypropylene glycols or 2,2-bis-(4'-hydroxycyclohexyl)-propane; polyglycidyl ethers of polyhydric phenols, such as 2,2-bis-(4'-hydroxyphenyl)-propane (=diomethane), 2,2-bis-(4'hydroxy-3',5'-dibromophenyl)-propane, bis-(4-hydroxyphenyl)-sulphone, 1,-1,2,2-tetrakis-(4'-hydroxyphenyl)-ethane or condensation products, manufactured in an acid medium, of formaldehyde with phenols, such as phenol-novolacs or cresol-novolacs; further di- or poly-($\beta$-methylglycidyl)-ethers of the abovementioned polyalcohols and polyphenols; polyglycidyl esters of polycarboxylic acids, such as, for example, phthalic acid diglycidyl ester, tetrahydrophthalic acid diglycidyl ester or hexahydrophthalic acid diglycidyl ester; triglycidyl isocyanurate, N,N'-diglycidyl-5,5-dimethylhydantoin, 1-glycidyl-3-(2'-glycidyloxypropyl)-5,5-dimethylhydantoin, 1-(glycidyloxymethyl)-3-glycidyl-5,5-dimethylhydantoin, and aminopolyepoxides, such as are obtained by dehydrohalogenation of the reaction products of epihalogenohydrin and primary or secondary amines, such as aniline or 4,4'-diaminodiphenylmethane; further, alicyclic compounds containing several epoxide groups, such as vinylcyclohexene diepoxide, dicyclopentadiene diepoxide, ethylene glycol-bis-(3,4-expoxytetrahydrodicyclopentadien-8-yl)-ether, bis-(3,4-epoxycyclohexylmethyl)-adipate, (3',4'-epoxycyclohexylmethyl)-adipate, (3',4'-epoxycyclohexylmethyl)-3,4-epoxycyclohexane-carboxylate, (3',4'-epoxy-6'-methylcyclohexylmethyl)-3,4-epoxy-6-methylcyclohexane-carboxylate, bis-(cyclopentyl)-ether diepoxide or 3-(3',4'-epoxycyclohexyl)-2,4-dioxaspiro-(5.5)-9,10-epoxyundecane.

A further subject of the present invention are therefore curable mixtures which are suitable for the manufacture of mouldings, including sheet-like structures, and which contain the glycidylurethanes according to the invention, optionally together with other diepoxide or polyepoxide compounds and also curing agents for epoxide resins, such as polyamines or polycarboxylic acid anhydrides.

The glycidylurethanes or β-methylglycidylurethanes according to the invention and their mixtures with other polyepoxide compounds and/or curing agents can furthermore be mixed, in any stage before curing, with customary modifiers, such as extenders, fillers and reinforcing agents, pigments, dyestuffs, organic solvents, plasticisers, flow control agents, agents for conferring thixotropy, flameproofing substances and mould release agents.

As extenders, reinforcing agents, fillers and pigments which can be employed in the curable mixtures according to the invention there may, for example, be mentioned: coal tar, bitumen, glass fibres, boron fibres, carbon fibres, cellulose, polyethylene powder, polypropylene powder, mica, asbestos, quartz powder, slate powder, aluminium oxide trihydrate, chalk powder, gypsum, antimony trioxide, bentones, silica aerogel ("AEROSIL"), lithopones, baryte, titanium dioxide, carbon black, graphite, iron oxide or metal powders, such as aluminium powder or iron powder.

Suitable organic solvents for modifying the curable mixtures are, for example, toluene, xylene, n-propanol, butyl acetate, acetone, methyl ethyl ketone, diacetone-alcohol, ethylene glycol monomethyl ether, monoethyl ether and monobutyl ether.

As plasticisers for modifying the curable mixtures, dibutyl phthalate, dioctyl phthalate and dinonyl phthalate, tricresyl phosphate, trixylenyl phosphate and also polypropylene glycols can, for example, be employed.

Particularly for use in the lacquer field, the new glycidylurethanes can furthermore be partially or completely esterified in a known manner with carboxylic acids such as, in particular higher unsaturated fatty acids. It is furthermore possible to add other curable synthetic resins, for example phenoplasts or aminoplasts, to such lacquer resin formulations.

The curable mixtures can be used, in the unfilled or filled state, optionally in the form of solutions or emulsions, as laminating resins, paints, lacquers, dipping resins, impregnating resins, casting resins, compression moulding compositions, sintering powders, spreading and filling compositions, floor covering compositions, potting and insulating compositions for the electrical industry and adhesives, and for the manufacture of such products.

In the examples which follow, parts denote parts by weight and percentages denotes percentages by weight.

I. MANUFACTURING EXAMPLES

Example 1

1.854 mols of one of the urethanes I–IV indicated below are stirred for 40 minutes at 70°C with 1,765 g of epichlorohydrin (18.54 mols) and 12 g of 50% strength aqueous tetramethylammonium chloride solution.

An azeotropic circulatory distillation is then established by applying a vacuum of 50–90 mm Hg, in such a way that at a heating bath temperature of 135°–155°C the temperature of the reaction mixture is 60°C and rapid distillation is ensured.

170.5 g of 50% strength aqueous sodium hydroxide solution (2.13 mols) are now added dropwise over the course of 135 minutes with vigorous stirring. At the same time the water present in the reaction mixture is continuously removed and separated off. After the dropwise addition, the mixture is additionally distilled for 45 minutes under the indicated conditions, in order to remove the water completely. It is then cooled to 35°C, the sodium chloride produced in the reaction is filtered off and the salt is eluted with 50 ml of epichlorohydrin. To remove the last traces of alkalis, salt and catalyst the organic solution is extracted by shaking with 150 ml of water. The aqueous phase is separated off and the organic phase is completely concentrated on a rotary evaporator at 60°C under a slight vacuum from a waterpump. Thereafter the residue is dried to constant weight at 55°C and under 0.5 mm Hg.

The N-glycidylurethanes thus obtained were purified by fractional distillation or recrystallisation.

The urethanes employed correspond to the following structure:

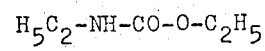 Urethane I

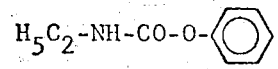 Urethane II

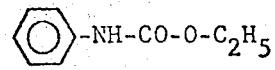 Urethane III

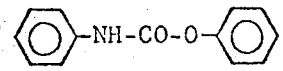 Urethane IV

|  | Urethane I | Urethane II | Urethane III | Urethane IV |
|---|---|---|---|---|
| Crude yield (% of theory) | 21 | 105 | 92 | 100 |
| Total chlorine (%) | 6.2 | 7.1 | 1.7 | 5.3 |
| Pure yield (% of theory) | Traces | Traces | 80 | 31 |
| Epoxide content (% of theory) | — | — | 93 | 38 |
| Boiling point | — | — | 130–132°C /0.2 mm Hg | Mixture: melting point 104°C |

As can be seen from the table, only urethanes with a structure corresponding to urethane III can be glycidylated cleanly and specifically, using the above method.

The N-glycidyl-N-phenyl-O-ethylurethane manufactured, and purified, in this way displays the following analytical data:

| Calculated | Found |
|---|---|
| 65.1% C | 65.1% C |
| 6.8% H | 6.7% H |
| 6.3% N | 6.4% N |
| 0.0% Cl | <0.3% Cl |

The proton-magnetic resonance spectrum (60 Mc H—NMR, recorded in CDCl₃ at 35°C against tetramethylsilane as the standard) shows, through the signals measured, that the following structure applies:

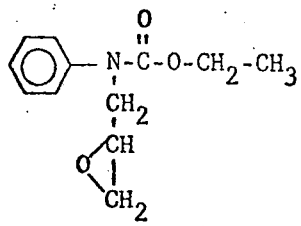

Example 2

A mixture of 605.4 g (1.845 mols) of a diurethane manufactured from 1 mol of 1,4-butanediol and 2 mols of phenylisocyanate (melting point 181°–182°C), 3,415 g of epichlorohydrin (36.9 mols) and 24.2 g of 50% strength aqueous tetramethylammonium chloride solution is stirred for 40 minutes at 70°C, whereby a mobile, colourless suspension is produced. Dehydrohalogenation is then carried out for 180 minutes with 339 g of 50% strength aqueous sodium hydroxide solution (4.24 mols) in accordance with Example 1. Thereafter the mixture is additionally distilled for 60 minutes under the conditions mentioned in Example 1, and worked up in accordance with Example 1. However, after concentrating the organic solution, the following procedure is adopted. 100 ml of distilled water are added and the mixture is again distilled to dryness at 60°C under a vacuum from a waterpump. This operation is subsequently repeated with 120 ml of toluene. Thereafter the material is dried to constant weight at 60°C/0.2 mm Hg. 812.5 g (100% of theory) of a clear, light brown liquid of medium viscosity, of which the epoxide group content is 3.50 equivalents/kg (77.1% of theory) and the chlorine content is 2.1%, are obtained.

The proton-magnetic resonance spectrum (60 Mc HNMR, recorded in CDCl₃ against (CH₃)₄Si as the standard) shows, through the measured signals, that the new diglycidyl compound, which still contains approx. 15–20% of unreacted N—H groups, essentially corresponds to the following structure:

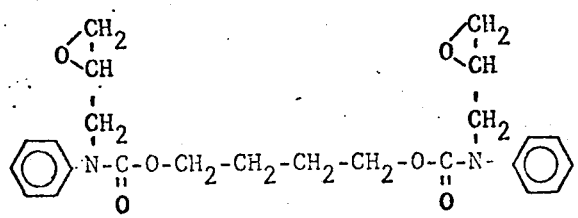

Example 3

Analogously to Example 2, 63.0 g (0.184 mol) of a diurethane manufactured from 1 mol of 4,4'-diisocyanatodiphenylmethane and 2 mols of ethanol are reacted with 340 g of epichlorohydrin (3.68 mols) and 2.42 g of 50% strength aqueous tetramethylammonium chloride solution. The dehydrohalogenation is carried out in accordance with Example 1, with 33.8 g of 50% strength aqueous sodium hydroxide solution (0.423 mol), over the course of 120 minutes. The subsequent reaction and working up are effected in accordance with Example 2.

64.5 g (77.2% of theory) of a yellow highly viscous resin containing 2.58 epoxide equivalents/kg (59% of theory) and essentially corresponding to the following structure:

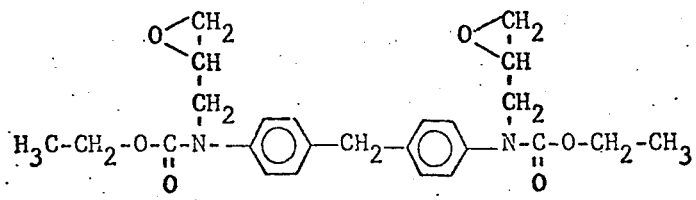

are obtained.

EXAMPLE 4

A mixture of 281 g (0.955 mol) of a diurethane obtained by reaction of 1 mol of toluylene-2,4-diisocyanate with 2 mols of isopropanol, 1,770 g of epichlorohydrin (19.1 mols) and 12.5 g of 50% strength aqueous tetramethylammonium chloride solution is treated in accordance with Example 2. The dehydrohalogenation is carried out with 175.5 g (2.195 mols) of 50% strength aqueous sodium hydroxide solution over the course of 150 minutes, in accordance with Example 1. Working up takes place in accordance with Example 2.

361 g (93.1%) of a light ochre-coloured clear viscous epoxide resin of epoxide content 4.55 equivalents/kg (92.4% of theory) are obtained. The new diglycidyl compound essentially corresponds to the following structure:

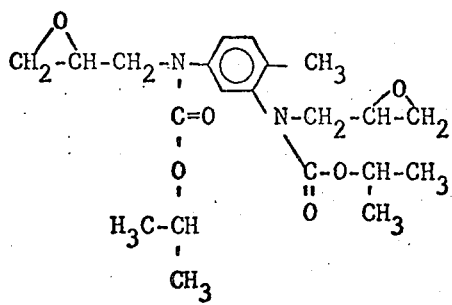

Example 5

278 g (0.963 mol) of a polyurethane manufactured from approximately equivalent amounts of 1,4-butanediol and toluylene-2,4-diisocyanate are reacted with 1,784 g of epichlorohydrin (19.25 mols) under the catalytic action of 12.6 g of 50% strength aqueous tetramethylammonium chloride solution, in accordance with Example 2. The dehydrohalogenation is carried out with 177 g (2.21 mols) of 50% strength aqueous sodium hydroxide solution in accordance with Example 1. After working up analogously to Example 2, 363 g (100% of theory) of a clear, light brown, highly viscous resin of epoxide content 4.83 equivalents/kg (91% of theory) are obtained. The new poly(glycidylurethane) essentially corresponds to the following recurring structural unit:

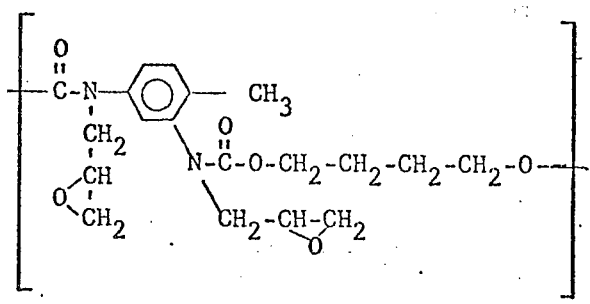

Example 6

192.5 g (10.46 mols) of a polyurethane (melting point 128°C) manufactured from approximately equivalent amounts of 1,3-di-(2'-hydroxy-n-propyl)-5,5-dimethylhydantoin and toluylene-2,4-diisocyanate are reacted with 853 g of epichlorohydrin (9.21 mols) and 6.04 g of 50% strength aqueous tetramethylammonium chloride solution in accordance with Example 2. The dehydrochlorination is carried out with 84.6 g of 50% strength aqueous sodium hydroxide solution in accordance with Example 1. Working up in accordance with Example 2 yields 224 g of a light yellow, solid poly(glycidylurethane) containing 3.17 epoxide equivalents/kg. The resin essentially consists of the following structural unit:

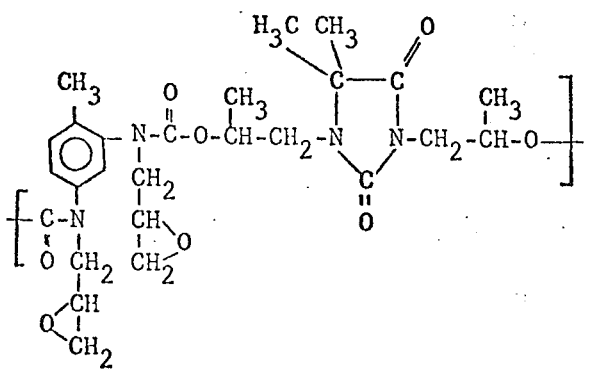

II. EXAMPLES OF APPLICATIONS

Example A 90 parts of the diepoxide manufactured according to Example 4 and containing 4.55 epoxide equivalents/kg are stirred with 10 parts of triethylenetetramine to give a clear, homogeneous mixture which is poured into aluminium moulds of 4 mm wall thickness and cured in 24 hours at 60°C. Clear, transparent, pale yellow mouldings having the following properties are obtained:

| | |
|---|---|
| Flexural strength (VSM 77,103): | 7.3–8.1 kp/mm² |
| Deflection (VSM 77,103): | 2.6–2.9 mm |
| Distortion point (DIN 53,461): | 68°C |
| Water absorption (4 days/20°C): | 1.27% |

Example B 89.4 parts of the epoxide resin manufactured according to Example 5 and containing 4.83 epoxide equivalents/kg are processed, and cured, with 10.6 parts of triethylenetetramine analogously to Example 4. Mouldings having the following properties are obtained:

| | |
|---|---|
| Flexural strength (VSM 77,103): | 9.5–10.2 kp/mm² |
| Deflection (VSM 77,103): | 3.2 mm |
| Impact strength (VSM 77,105): | 5.3 cm.kp/cm² |
| Distortion point (DIN 53,461): | 87°C |

Example C 90 parts of the epoxide resin used in Example B are stirred with 63.7 parts of hexahydrophthalic anhydride and 0.5 part of benzyldimethylamine at 70°C to give a clear homogeneous melt which is poured into aluminium moulds of wall thickness 4 mm, prewarmed to 80°C. Curing takes place in 5 hours at 80°C and 15 hours at 120°C. Mouldings having the following properties are obtained:

| | |
|---|---|
| Flexural strength (VSM 77,103): | 9.1–10.4 kp/mm² |
| Deflection (VSM 77,103): | 3.4–3.9 mm |
| Impact strength (VSM 77,105): | 8.0–9.8 cm.kp/cm² |
| Water absorption (4 days, 120°C): | 0.29% |
| Distortion point (DIN 53,461): | 83°C |

Example D 158 parts of the epoxide resin manufactured according to Example 6 and containing 3.17 epoxide equivalents/kg are processed, and cured, with 61.5 parts of hexahydrophthalic anhydride and 0.5 parts of benzyldimethylamine in accordance with Example C. Moulding having the following properties are obtained:

| | |
|---|---|
| Flexural strength (VSM 77,103): | 4.3 kp/mm² |
| Deflection (VSM 77,103): | 1.5 mm |

We claim:

1. A glycidylurethane or β-methylglycidylurethanes of the formula

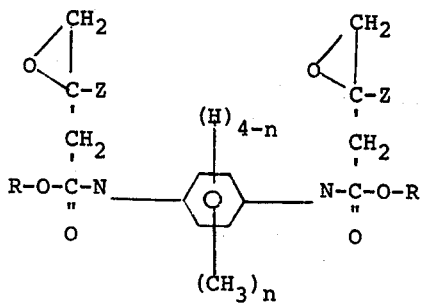
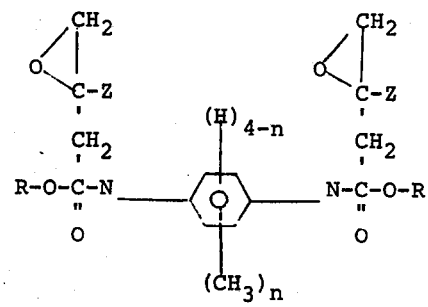
wherein Z is hydrogen or methyl, n is from 0 to 4, and R is an alkyl of 1 to 4 carbon atoms.
2. Diglycidylurethane according to claim 1, of the formula
* * * * *